Patented Oct. 8, 1940

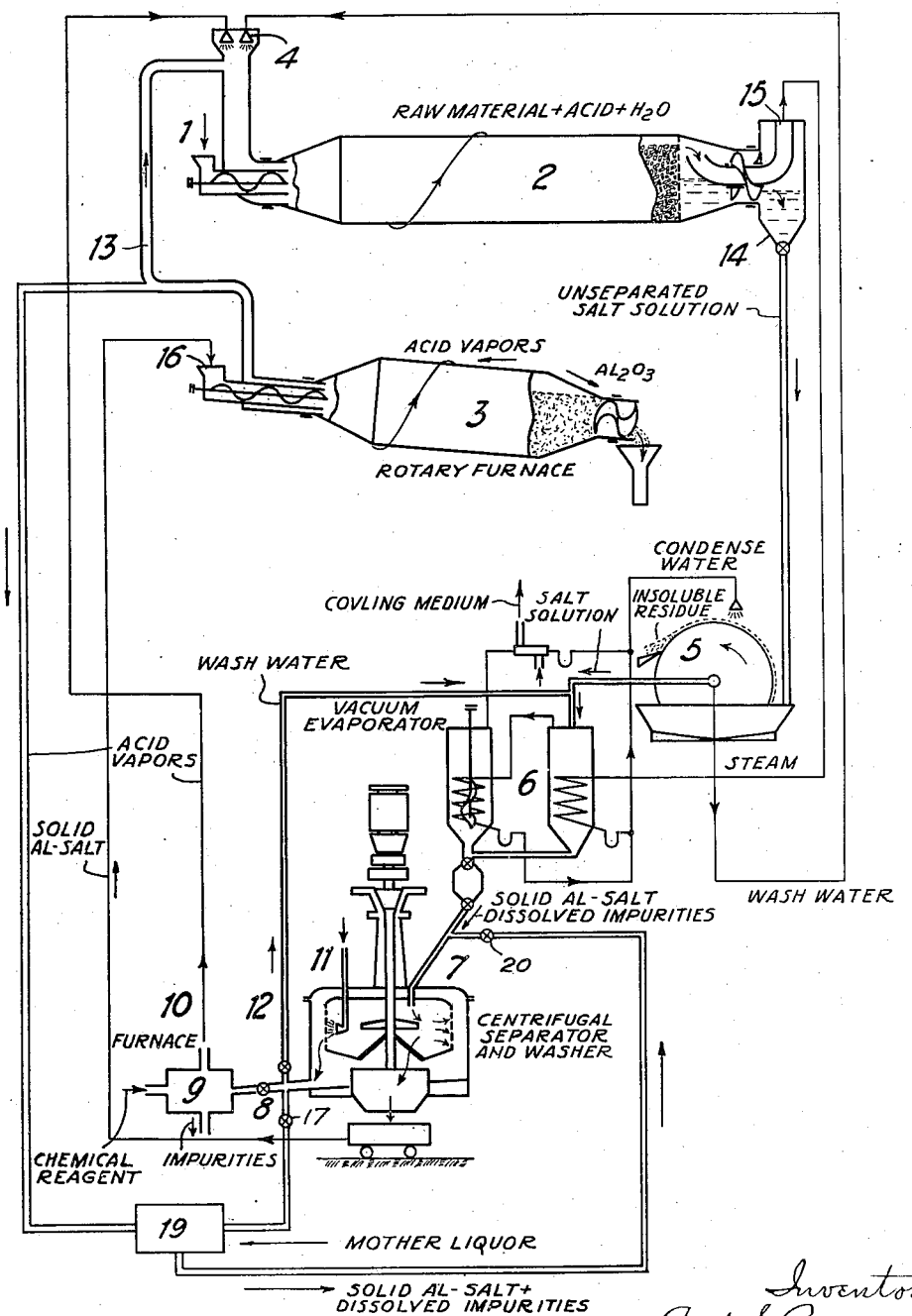

2,217,099

UNITED STATES PATENT OFFICE 2,217,099

METHOD OF PRODUCING PURE ALUMINA

Axel Sigurd Burman, Huddinge, Sweden

Application September 7, 1937, Serial No. 162,797
In Sweden September 15, 1936

4 Claims. (Cl. 23—141)

In producing pure alumina by acid methods, that is, by dissolving the raw material in acids, different aluminiferous raw materials, or even materials rich in silica, such as clay, may be used. This is of advantage over the alkali methods which require rather pure bauxite as raw material, but the advantage has, however, hitherto been counterbalanced by the costs incident to the removal of the impurities and the losses of acid, which latter, especially when hydrochloric acid or nitric acid is used, would render the process uneconomical even when they amount to only some few per cent.

In my pending application Serial No. 92,230 I have described a method of producing pure alumina from aluminiferous raw materials by dissolving the latter in an acid and recovering the aluminium salt produced by evaporation in vacuum by means of heat from steam evolved in dissolving the raw material, and then decomposing said salt in aluminium oxide and acid which latter is returned into the process.

The object of this invention is to perform said process by simple operations and practically without any loss of acid. The invention resides, chiefly, in that the salt solution produced by dissolving the aluminiferous raw material after removal of the insoluble residue is evaporated until a crystallized mass of aluminium salt is obtained, that the mother liquor which contains the chief part of the impurities is then separated from the salt mass by centrifuging or the like, that the aluminium salt is washed by means of water and that finally the wash water which contains a minor part of the impurities and aluminium salt, dissolved during the washing is added to the salt solution to be evaporated in a subsequent stage of the process.

The mother liquor separated from the crystallized salt by centrifuging is, preferably, eventually returned once or several times to a centrifuge, after such aluminium salt as has not been crystallized in the evaporation step has been precipitated in a subsequent step, which centrifuge already has a batch of salt solution to be centrifuged, particularly if there are several centrifuges as for example in a large size plant, in order to enrich the content of dissolved salts in said solution before final centrifuging and removal for further treatment.

After the final centrifuging and the removal of the mother liquor, the aluminium salt crystals are rapidly washed with water in the centrifuge in order to liberate them from contaminating adhering solutions of impurities and the wash water afterwards ejected. As, however, part of the aluminium salt crystals may have been dissolved in the washing step, the said wash with dissolved aluminium salt is returned to the initial evaporation step of the process in order to evaporate the water and concentrate the contained soluble salts together with a fresh batch of solution to be evaporated. The quantity of wash water is insignificant, amounting to only a fraction of the total amount of solution in each batch to be evaporated. In the described way nearly all soluble aluminium salt is recovered from the mother liquid at an insignificant cost.

The object of the treatment of the mother liquor collected which contains the chief part of the impurities of the evaporated salt solution, particularly the iron, in the form of easily soluble salts of the acid used together with the aluminium salt not crystallized, is to recover the acid contained therein by decomposing the salts and can be carried out in different ways. Before the decomposing of the salts the aluminium salt still contained in the mother liquor is, preferably, removed, for instance by concentrating the mother liquor collected by evaporation until the aluminium salt, for instance aluminium chloride, crystallizes out, whereupon said salt is separated from the remaining mother liquor by centrifuging and is purified by washing with water. Another way of separating the aluminium salt from the mother liquor is to add a strong acid to the mother liquor, for instance by supplying strong hydrochloric acid vapors to the mother liquor when hydrochloric acid has been used as dissolving agent for the raw material, whereupon the aluminium salt is separated from the remaining mother liquor by centrifuging and is purified by washing with water. The centrifuging and the washing of the aluminium salt recovered from the mother liquor as described is, preferably, performed together with the centrifuging and washing of the primary mass of aluminium salt obtained from the solution produced in dissolving the raw material.

When hydrochloric acid has been used as dissolving acid, the mother liquor remaining after the evaporation may be decomposed for instance by means of sulphuric acid or phosphoric acid, which form the corresponding salts while expelling the hydrochloric acid, or by means of superheated steam which converts the salts into the corresponding oxides of the impurities ($Fe_2O_3$, $CaO$, $MgO$). The alkali chlorides can, however, not be decomposed in the last-mentioned manner. In order to obtain a corresponding quantity of acid, an equivalent quantity of a chloride which can be decomposed by superheated steam, preferably $MgCl_2$, for instance in the form of carnallite ($KCl \cdot MgCl_2 \cdot 6H_2O$), is added. The solid residue may then be used as a fertilizer, preferably after the removal of the iron, which latter step can be carried out in such manner that the iron oxide is reduced to metallic iron which is separated magnetically. In carrying out the decomposition by means of superheated steam, the mother liquor is preferably atomized, for instance by means of a rotating disc in a furnace in which hot combustion gases are introduced so that a temperature of about 700° C. is obtained in the furnace. The steam required is in such case partly present in the combustion gases, and partly formed from the solution supplied. The hot acid gases escaping from the furnace are introduced in the water used as addition to the aluminiferous raw material, the acid being thus absorbed and the water preheated. The oxides are obtained in the furnace as a fine powder. The iron contained therein may be removed by reducing the iron oxide by means of generator gas before the latter is burned in the furnace, and the iron be separated magnetically or by wind sifting, centrifuging in a cyclone apparatus, or the like.

When the mother liquor contains a high percentage of iron and hydrochloric acid has been used as dissolving agent the mother liquor can also with advantage be decomposed thermally in the presence of a carbonaceous substance, for instance charcoal, sawdust, sugar or other carbohydrate, the hydrochloric acid being easily and completely driven off and the iron remaining as oxide in mixture with carbon which latter on heating to a high temperature reduces the iron oxide into metallic iron. The iron chloride may also be recovered as such from the chloride crystal mass obtained in evaporating the solution produced, by extracting it by means of a suitable solvent for iron chloride, for instance ether or acetone.

In the annexed drawing I have illustrated diagrammatically one embodiment of the invention in which hydrochloric acid is used as dissolving agent for the aluminiferous raw material. The raw material, for instance clay, which is introduced at 1, is dissolved in the rotary cylinder 2 by means of hydrochloric acid formed from hot acid gases obtained by the thermal decomposition of aluminium chloride produced in a subsequent stage of the process in the rotary furnace 3 and in the furnace 9, and water supplied through the conduit 4. After the decomposing of the raw material, the solution is separated from the insoluble residue in the filtering apparatus 5 and then evaporated in the vacuum apparatus 6 by means of heat of steam supplied from the cylinder 2 resulting from dissolving the raw material as above described, until a thick chloride crystal mass is formed. Said chloride mass is introduced into the centrifuge 7 from which the mother liquor is removed whereupon the salt is washed with water. The best washing effect is obtained when the washing is performed in the centrifuge immediately after the removal of the mother liquor.

During the centrifuging, valves 8, 17 and 18 are closed. After the first centrifuging operation, valve 17 is opened and the mother liquor is conducted from the centrifuge to a vessel 19 where the remaining aluminium salt is precipitated by means of strong acid vapors introduced from the furnace 3. The precipitated solid Al-salt crystals and the dissolved impurities of the remaining mother liquor are afterwards conveyed to another or to the same centrifuge 7 by opening the valve 20, whereafter the mixture is centrifuged, either alone or together with another batch, and the remaining mother liquor with dissolved impurities is ejected from the said aluminium chloride crystals. After closing of valve 17, valve 8 is opened and the said remaining mother liquor with the dissolved impurities is conveyed to the furnace 9 for further treatment. After closing of valve 8, water is introduced through pipe 11 into the centrifuge and the crystals are rapidly washed. Valve 18 is then opened and the wash water with eventually dissolved aluminium chloride is conveyed to the evaporator 6.

After washing of the solid aluminium chloride crystals, said crystals are discharged from the centrifuge and conveyed to the funnel 16 and introduced into the furnace 3, in which the crystals are heated so that the acid vapors and crystal water in the form of steam are liberated and conveyed by pipe 13 to the rotary drum 2 for the initial decomposition step of the raw material.

In the furnace 9 the remaining mother liquor is heated together with sulphuric acid, whereby the hydrochloric acid radical is liberated from the accompanying salts and the hydrochloric acid is regenerated and returned through the conduit 10 to the cylinder 2. Instead of sulphuric acid, any other chemical reagent, capable of liberating the acid, for example hot combustion gases, can be introduced into the furnace 9. After liberation of the acid, the dissolved impurities are discharged from furnace 9.

What I claim is:

1. A continuous cyclic process for the production of pure aluminium oxide from aluminiferous raw material, comprising initially subjecting said raw material in mixture with water to a decomposing reaction by directly contacting the same with hot acid vapors to form a salt solution, removing the remaining insoluble residues from the said raw material by filtering, evaporating the whole salt solution with its contents of dissolved aluminium, iron, alkaline earth metals, alkali metals and other dissolved impurities by means of heat from steam evolved from the said decomposing reaction until a concentrate is obtained, consisting of a substantial part of solid crystallized aluminium salt and a mother liquor containing in solution the rest of the aluminium salt and the entire quantities of dissolved impurities, ejecting the mother liquor from the said solid aluminium salt by centrifuging, purifying the said solid aluminium salt crystals from contaminations of adhering solutions of iron, alkaline earth metals, alkali metals and other dissolved impurities by washing the crystals with water and keeping the wash water separate from the mother liquor, adding said wash water to fresh salt solution to be evaporated in order to recover dissolved aluminium salt from the wash water, thermally decomposing the said solid purified aluminium salt crystals into aluminium oxide and acid vapors, said acid vapors being introduced together with water to form acid in the initial decomposition step of the process.

2. A continuous cyclic process for the production of pure aluminium oxide by dissolving aluminiferous raw material, comprising initially subjecting said raw material in mixture with water to a decomposing reaction by directly contacting the same with hot acid vapors to form a salt solution, removing the remaining insoluble residues from the said raw material by filtering, evaporating the whole salt solution with its contents of dissolved aluminium, iron, alkaline earth metals, alkali metals and other dissolved impurities by means of heat from steam evolved from said decomposing reaction until a concentrate, consisting of solid crystallized aluminium salt and a mother liquor, containing in solution the rest of the aluminium salt and the entire quantities of dissolved iron, alkaline earth metals, alkali metals and other dissolved impurities, is obtained, ejecting the mother liquor from said solid aluminium salt by centrifuging, precipitating the remaining aluminium salt contained in the mother liquor by introducing a strong acid thereinto, ejecting the dissolved impurities from the said precipitated aluminium salt crystals, adding the said precipitated aluminium salt crystals to the previously obtained solid aluminium salt crystals before washing, purifying the solid aluminium salt crystals from contaminations of adhering solutions of iron, alkaline earth metals, alkali metals and other dissolved impurities by means of washing the crystals with water and keeping the wash water separate from the mother liquor, adding said wash water to fresh salt solution to be evaporated in order to recover from the wash water dissolved aluminium salt, thermally decomposing the said solid purified aluminium salt crystals in aluminium oxide and acid vapors, said hot acid vapors being introduced together with said water to form acid in the initial decomposition step of the process.

3. A continuous cyclic process for the production of pure aluminium oxide by dissolving aluminiferous raw material comprising initially subjecting said raw material in mixture with water to a decomposing reaction by directly contacting the same with hot hydrochloric acid vapors to form a salt solution, removing the remaining insoluble residues from the said raw material by filtering, evaporating the whole salt solution with its contents of dissolved aluminium, iron, alkaline earth metals, alkali metals and other dissolved impurities by means of heat from steam evolved from said decomposing reaction until a concentrate consisting of solid crystallized aluminium chloride and a mother liquor containing in solution the rest of the aluminium chloride and the entire quantities of dissolved iron, alkaline earth metals, alkali metals and other dissolved impurities is obtained, ejecting the mother liquor from said solid aluminium chloride by centrifuging, precipitating the remaining aluminium chloride contained in the mother liquor by introducing into the same a strong hydrochloric acid vapor, ejecting the remaining mother liquor with its dissolved impurities from the said precipitated aluminium chloride, adding the said precipitated aluminium chloride crystals to the previously obtained solid aluminium chloride crystals before washing, purifying the solid aluminium chloride crystals from all contaminations of adhering solutions of iron, alkaline earth metals, alkali metals and other dissolved impurities by washing the crystals with water and keeping the wash water separate from the mother liquor, adding said wash water to fresh salt solution to be evaporated in order to recover from the wash water dissolved aluminium chloride, expelling the acid-radical from the salts in the said mother liquor in the presence of heat in the form of vapor, thermically decomposing the said solid purified aluminium chloride crystals into aluminium oxide and acid vapors, and introducing the acid vapors obtained together with the acid vapors liberated from the mother liquor and water to form acid to be used in the initial decomposition step of the process.

4. A continuous cyclic process for the production of pure aluminium oxide from aluminiferous raw material, which process comprises initially subjecting said raw material in mixture with water to a decomposing reaction by directly contacting the same with hot hydrochloric acid vapors to form a salt solution, removing the remaining insolubles from the said raw material by filtering, evaporating the whole salt solution with its contents of dissolved aluminium, iron, alkaline earth metals, alkali metals and other dissolved impurities by means of heat from steam evolved from the decomposition reaction step until a concentrate is obtained, consisting of a substantial part of solid crystallized aluminium chloride salt and a mother liquor containing in solution the rest of the aluminium chloride salt and the entire quantities of dissolved impurities, ejecting the mother liquor from the said solid aluminium chloride salt by centrifuging, purifying the said solid aluminium chloride salt crystals from contaminations of adhering solutions of iron, alkaline earth metals, alkali metals and other dissolved impurities by means of washing the crystals with water in such a way that the wash water is kept separate from the mother liquor, adding said wash water to fresh salt solution to be evaporated in order to recover in the wash water dissolved aluminium chloride salt, thermally decomposing the said solid purified aluminium chloride salt crystals in aluminium oxide and hydrochloric acid vapors, said hydrochloric acid vapors being introduced together with said water to form hydrochloric acid in the initial decomposition step of the process.

AXEL SIGURD BURMAN.